United States Patent [19]

Shrader

[11] 3,904,065

[45] Sept. 9, 1975

[54] VACUUM SEAL FOR ENVELOPE PORTIONS

[75] Inventor: Merrald Buren Shrader, Lancaster, Pa.

[73] Assignee: RCA Corporation, New York, N.Y.

[22] Filed: Aug. 8, 1973

[21] Appl. No.: 386,643

[52] U.S. Cl. .................. 220/2.1 R; 29/458; 29/525; 174/50.61; 316/4; 316/30; 403/270; 403/282
[51] Int. Cl.² ...................... H01K 1/36 H01 J/61/36
[58] Field of Search ......... 220/2.1 A, 2.1 R; 29/458, 29/525, 25.1; 316/4, 6, 19, 30, 31; 403/282, 403/270; 174/50.61

[56] References Cited
UNITED STATES PATENTS

| | | | |
|---|---|---|---|
| 2,984,759 | 5/1961 | Vine | 220/2.1 R X |
| 3,024,300 | 3/1962 | Martin | 29/525 X |
| 3,422,320 | 1/1969 | Woodling | 29/458 UX |
| 3,767,283 | 10/1973 | Sivyer | 316/19 |

*Primary Examiner*—Billy S. Taylor
*Attorney, Agent, or Firm*—Glenn H. Bruestle; Robert J. Boivin

[57] ABSTRACT

A first tubulation which axially extends from a first envelope portion and a second tubulation which axially extends from an L-shaped ring, a radial extending portion of which is attached to a second envelope portion, are sealed by a cold compression seal and by brazing, respectively, to an annular ring of high compressive strength which is interposed in telescoped relation with the first and second tubulations.

6 Claims, 5 Drawing Figures

VACUUM SEAL FOR ENVELOPE PORTIONS

The invention herein described was made in the course of or under a contract with the Department of the Army.

BACKGROUND OF THE INVENTION

This invention relates to seals for electron tubes, and particularly to improved seals of the compression type.

Compression type seals are utilized in certain electron tube constructions for sealing operative elements within envelope portions and/or enclosing such envelope portions in a vacuum tight manner. In such constructions, tubulations extending from respective portions to be sealed, are forcibly urged into telescoped sealing relationship, as described for example in U.S. Pat. No. 3,036,674 issued to T. G. Branin and U.S. Pat. No. 3,024,300 issued to I. E. Martin.

For certain electron tube constructions, however, prior art compression seals of this type impose undesirable design constraints on the material compositions of the envelope portions and their respective wall thicknesses. Other types of compression seals may also require the application of heat during the sealing process which may be detrimental to the operative elements of the device. Other possible deficiencies of such compression seals include, for example: outgassing caused by the compressive forces and/or thermal characteristics of the materials, thermal limitations, and difficult and/or expensive manufacturing and assembly operations. These limitations of prior art compression seals are particularly critical for example in electron tubes which must be small and light weight. For example, in the assembly of a proximity focused image tube, a compression seal which is not subject to these limitations is particularly desired since the sealing of certain operative elements within a small thin-walled tube-like body (e.g. the photocathode) must be accomplished without thermal destruction and/or contamination of the operative elements.

DESCRIPTION OF THE PREFERRED EMBODIMENTS

Figure 1:
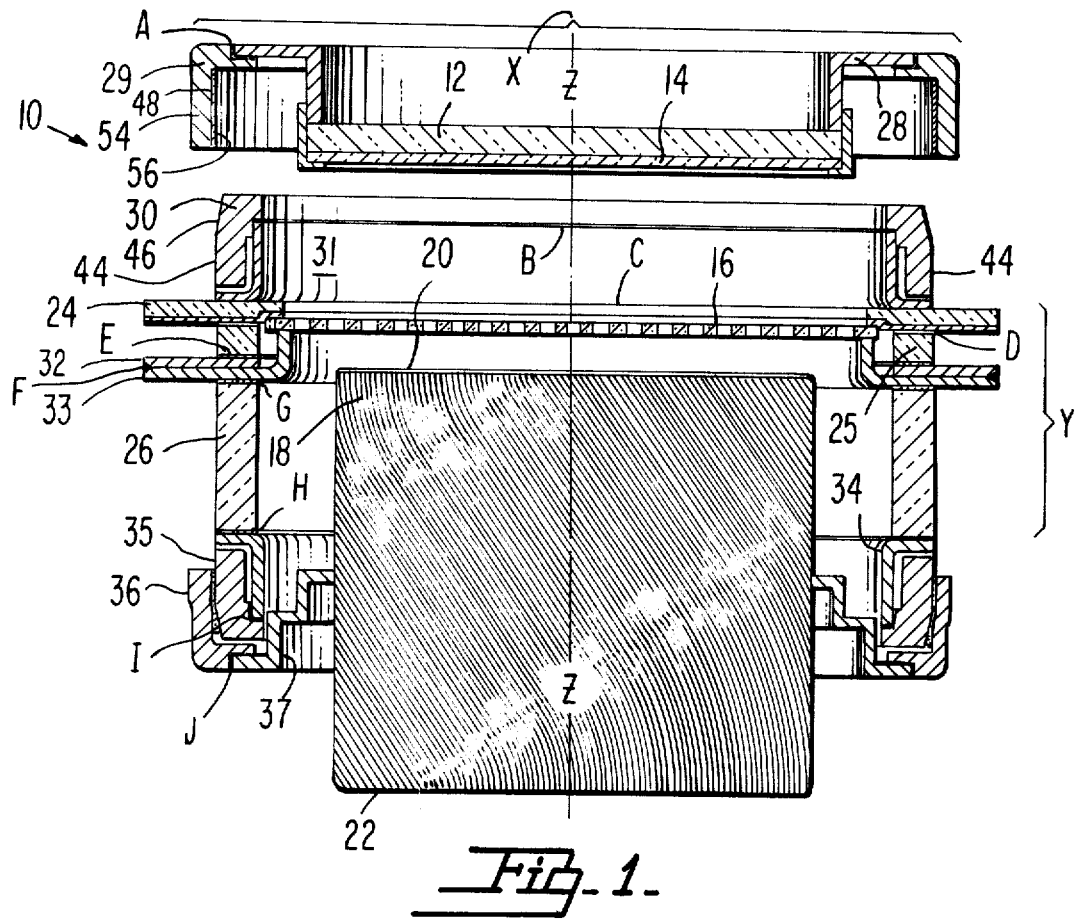
FIG. 1 is a cross-sectional view of the unassembled envelope portions of a proximity focused image tube utilizing one emobdiment of the novel compression seal in accordance with the invention.

Referring generally to FIG. 1, there is shown two unassembled portions of a proximity focused image intensifier tube 10 comprising: a tube-like body Y, having a plurality of operative elements disposed with axial symmetry (aligned), in a spaced apart relation, and an annular photocathode assembly X. Tube portions X and Y are sealed in a vacuum-tight manner by means of the novel seal as hereinafter described. When assembled, the tube 10 has an axial length (along axis Z—Z in FIG. 1) of about 1.0 inch, an inner diameter of about 1.025 inches and an outer diameter of about 1.150 inches. The theory of operation of this and similar proximity focused image intensifier devices is discussed in U.S. Pat. No. 3,567,947 issued to C. D. Robbins.

The compactly designed tube 10 comprises a plurality of operative and electrically isolated elements disposed in close proximity to each other. The operative elements of tube 10 include: a photocathode 14 disposed on a sapphire input window 12, a microchannel plate 16, and a fiber optic output image inverter 18 having an inner phosphor screen surface 20 and an outer viewing surface 22.

To accomplish a compact tube design having the requisite spacing and electrical isolation of operative elements, the assembled tube 10, consists of a plurality of accurately dimensioned annular insulating members 24, 25 and 26 and annular rings 28–37 sealed in axial symmetry (aligned) to each other. Preferably, the members 24, 25, and 26 consist of a ceramic material; however other suitable insulating materials such as, for example, glass may be utilized. Annular rings 28, 31–34, and 37 preferably consist of a conductive metallic material, such as, for example, Kovar (an alloy of nickle, iron and cobalt), selected to possess respective coefficients of thermal expansion approximately equal to that of the members or rings to which they are sealed; however, their composition is not otherwise considered critical.

In the manufacture of tube 10, the tube portions X and Y are preassembled in a series of preassembly sealing operations at points A through J (FIG. 1), as for example, by brazing or welding.

Figure 2:
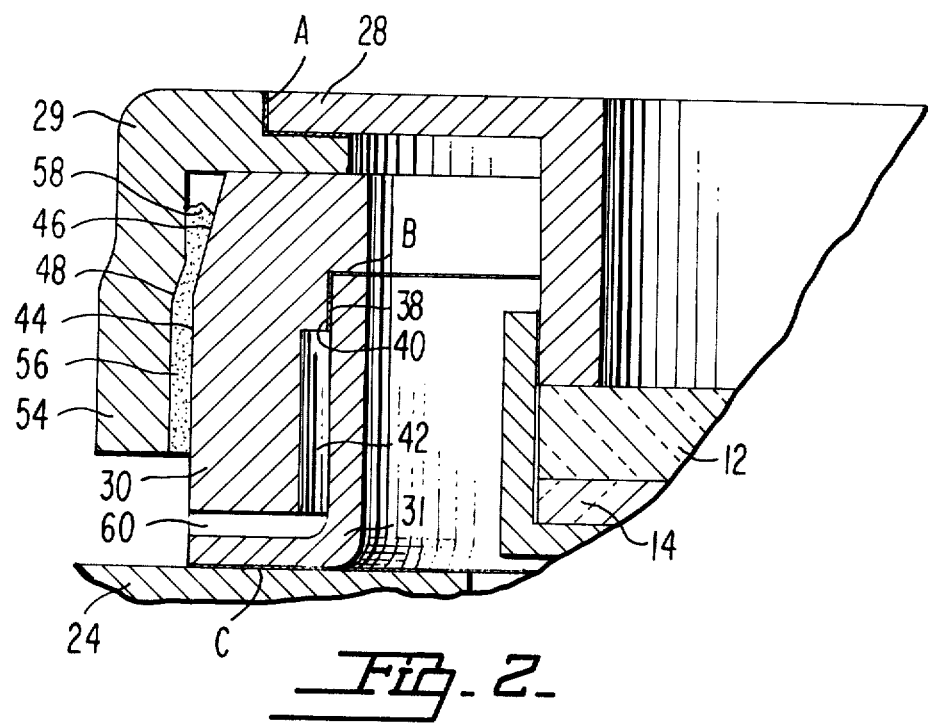
FIG. 2 is an exaggerated fragmentary cross-sectional view of the assembled novel seal shown in FIG. 1.

Referring now to FIGS. 1 and 2, the novel seal for sealing the tube portion X and Y includes rings 29, 30 and 31. A similar seal is shown in FIG. 1 joining the body Y with the annular ring 37 (the mounting ring for the fiber optic element 18). Rings 29 and 31 each include a radial extending portion and an axial extending tubulation (a hollow cylindrical portion) having an approximately L-shaped traverse cross-section. The radial extending portion of rings 29 and 31 are sealed, at points A and C, respectively, to ring 28 (the mounting ring for photocathode 14) and a member 24. Ring 30 includes a compression sealing surface comprising a portion of its outer cylindrical surface 44 and frusto-conical surface 46 extending therefrom as shown in FIG. 2. The angle of the taper of the frusto-conical surface 46 may vary according to the materials used and the application for which the seal is designed. For example, an angle of taper between 5° and 12° is acceptable; however, a taper of approximately 8° appears preferable for the embodiment shown.

Rings 30 and 31 are aligned by a closely-spaced portion of their respective cylindrical interfacing surfaces 38 and 40. A radial extending lip surface on ring 30 is sealed to the axial extending tubulation of ring 31, in preassembly, at point B, as, for example by brazing. A portion of the interfacing surfaces between rings 30 and 31 is spaced-apart to form the annular gap 42. The annular gap 42 destroys the capillary action tending to draw the brazing solder from its applied region at point B through the interface between rings 30 and 31. Other methods of sealing ring 30 and 31 may be utilized which do not involve possible capillary action at the interfacing surfaces. In such a case the gap 42 is not necessarily required.

The ring 29 includes an axial extending tubulation 54 having an inner cylindrical surface 48 preferably coated with silver, by plating, to produce a deformable coating 56. The inner cylindrical surface of the coating 56 comprises a compression sealing surface on ring 29 having a diameter slightly smaller than the outer cylindrical surface 44 of ring 30. The coating 56 is preferably about 1–2 mils thick. Preferably, the inner diameter of the compression sealing surface of ring 29 is about 0.006 inch–0.008 inch smaller than the outer diameter of ring 30; however, the difference may vary depending upon the strength of the respective materials, the size and the contemplated use of the device.

To form the seal between tube portions X and Y, the annular ring 30 which is attached to the body Y is telescoped partly into the tubulation 54 of ring 29 with appreciable axially directed force. While the compression sealing surface on the axial extending tubulation 54 has a slightly smaller internal diameter than the outer diameter of ring 30, the frusto-conical surface 46 of the ring 30 permits an initial partial and substantially forceless telescopic entrance of the ring 30 into the tubulation. Thereafter continued application of the axial force produces a slight radial enlargement of the periphery of the tubulation 54, the extent of which depends upon the inner and outer diameter of tubulations 54 and ring 30, respectively.

During the forcing accomodation of rings 29 and 30, considerable pressure per unit area is exerted at their interfacing compression sealing surfaces. This pressure produces a scraping and wiping action during the sealing operation which deforms the coating 56 to form an enlarged coating mass 58 between the ring 29 and 30 and aids in causing a type of plastic flow of the coating material into any irregularities which exist at the interfacing compression sealing surfaces. While the deformable coating 56 consists of a silver material, numerous other materials characterized in having adequate pressure responsive plastic flow are suitable. For certain embodiments which utilize highly polished compression sealing surfaces, the coating 56 may not be required. The presence of the deformable coating 56, however, permits the assembly of the novel seal with much less applied force and without highly polishing the respective sealing surfaces.

The frusto-conical surface 46 serves primarily as a stress concentrating means. The effect of such stress concentration is to enable an intimate vacuum-tight seal to be obtained between rings 29 and 30 through the application of practical values of axial force. The amount of force necessary to produce the desired pressure at the compression sealing interface increases with the area of contact between the rings. In the case of the preferred embodiment, an axial force of approximately 1000 lbs. was found adequate. Preferably, the frusto-conical surface 46 describes an approximately straight taper, however, the stress concentrating means may also take the form of an arcuate taper.

Once the axially directed force is removed, the compressive stresses will continue to be exerted due to the elasticity or resiliance of one or more of the rings 29, 30 and 31, i.e., their tendancy to return to their unstrained state. One or more of these rings is designed to act as a strain storage means similar to the action of a spring whereby the coacting elasticities of the respective members maintains the intimate sealing contact required at the sealing interface to produce a stable seal upon the removal of the applied axial force. The compression sealing process effectively "sandwiches" the tubular ring 30 between the axial extending tubulations of rings 29 and 31.

The bending moments induced by the compressive sealing forces created at the sealing interface by the applied axial force are resisted or relieved by the respective rings 29, 30, and 31 in accordance with their relative compressive strength and/or elasticity. Unlike prior compression seals, the compressive sealing forces to a large extent are not transmitted to the other regions of the thin walled tube-like body Y, such as for example, the member 24. Yet, the material composition of rings 29, 30 and 31 must be of sufficient compressive strength to force the coating 56 into a "plastic flow" state at the compression sealing interface between rings 29 and 30. Also, as previously stated, one or more of the rings 29, 30 and 31 must provide the requisite degree of resiliance or elasticity required to act as the strain storage means. The compressive strength and/or resiliance of certain materials, in the above mentioned contexts, is a function of both the hardness of the material and its thickness. Thus, the selection of respective materials for rings 29, 30 and 31 and their respective wall thicknesses is particularly critical. In this one embodiment, I have found a suitable material for ring 29 and 30 is an A.I.S.I. Type A–2 tool steel. A Rockwell hardness of C 10/30 and C 54/57 (or harder) for rings 29 and 30, respectively, were found adequate. Also, a suitable combination of radial thicknesses for rings 29 and 30, respectively, is approximately 0.02 inch and 0.08 inch. In this embodiment, the strain storage function is accomplished primarily by ring 29. The annular ring 30 has a high compressive strength and cooperates with the compressive strength and relieving ability of the L-shaped ring 31 to prevent compressive forces from being transmitted to the member 24. Other wall thicknesses and materials having the requisite strength and elasticities may also be utilized for the rings 29, 30 or 31. However, in the formation of a vacuum tight compression seal between the interfacing compression sealing surfaces of rings 29 and 30, numerous constraints are imposed on the construction of these rings as fully explained in the previously referenced patent by I. E. Martin and herein incorporated by reference. The combination of the annular ring 30, of high compressive strength, and the L-shaped annular ring 31, effectively isolates the member 24 from many of these design constraints. In particular, the construction of the L-shaped ring 31, as shown, provides relief from the compression sealing forces and thermal expansion forces which would ordinarily impose design limitations on the material and thickness of the envelope portions to be joined.

The seal depicted in FIGS. 1 and 2 includes an expansion gap 60 at an unsealed radial extending interface between rings 30 and 31 which is adequate in cross-sectional area to avoid seal destruction due to thermal expansion differences between rings 30 and 31. For the preferred embodiment, an expansion gap having an axial length of 0.125 inch was considered preferable; however the length of the expansion gap 60 is not considered critical and may vary according with the materials and contemplated use of the device. Materials for rings 29 and 30 are preferably selected to possess compatible coefficients of thermal expansion, thereby preventing thermal expansion differences from destroying the cold compression seal between rings 29 and 30. The material for ring 31 is selected to possess a coefficient of thermal expansion which is compatable with that of the member 24. Often, materials which are desirable for the member 24 are incompatable from a thermal expansion viewpoint, with the materials which are desirable for rings 29 and 30. In the novel seal construction, the expansion gap 60 and the relieving ability of the L-shaped ring 31 permit the use of a greater variety of materials and thicknesses for tube portion Y without affecting the vacuum tight integrity of the assembled device. Also the thermal cycling ability of the cold compression seal is improved.

Numerous variations in the design of the novel seal may be accomplished without deviating from the inventive concept. The ring 30 may be comprised of a suitable insulating material having sufficient compressive strength, thus permitting the annular rings 29 and 31 to be electrically isolated from each other. With such a construction, rings 29 and 31 could be used as electrodes leading to operative elements within the interior of a tube-like body similar to body Y. For example, a novel seal could be accomplished in which an annular ceramic ring similar in construction to ring 30 and a metallic ring similar to ring 29 is joined by the cold compression seal herein described. Suitable variations in the wall thickness of the respective rings 29, 30, and 31 required to accomplish this and other variations of the novel seal, may be accomplished by persons skilled in the art.

Figure 4:
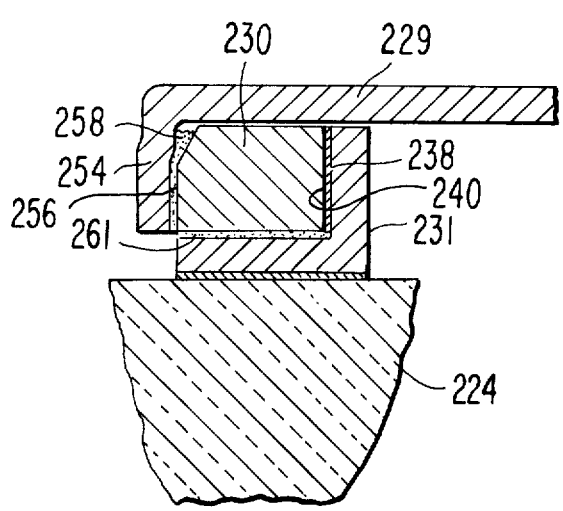
FIGS. 3–5 are exaggerated fragmentary cross-sectional views of various alternative embodiments of the novel compression seal in accordance with the invention.
Figure 5:
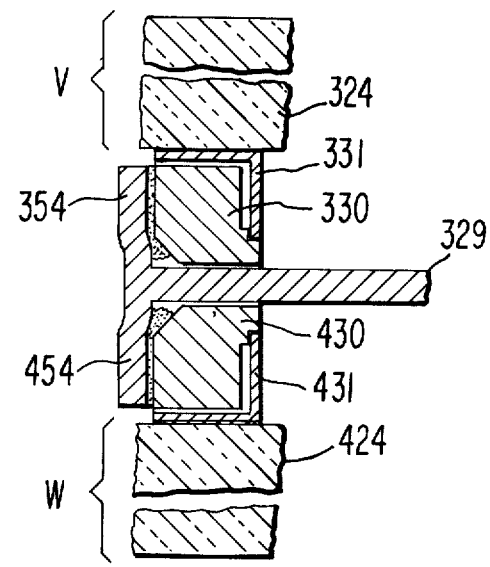
Figure 3:
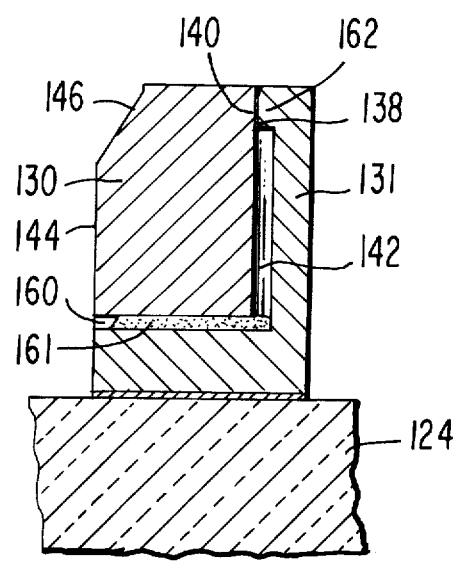

FIGS. 3–5 depict other alternative embodiments in which similar numerical designations designate similar parts having analagous functions. Referring to FIG. 3, there is shown a portion of the seal in which a radial extending annular lip portion 162 is situated on an L-shaped annular ring 131. Aligning interfacing surfaces 138 and 140 between annular ring 130 and 131 are sealed by a suitable method analagous to that accomplished at point B of FIG. 2. An expansion gap 160 at the unsealed radial extending interface extending between ring 130 and 131, includes a compressible filler material 161 for absorbing thermal expansion differences between the materials selected for rings 130 and 131.

Referring to FIG. 4, the annular gap 42 depicted in FIGS. 1 and 2 is eliminated. In this alternative embodiment, a compressible filler material 261 provides a means for absorbing thermal expansion differences between the materials and also serves to destroy the capillary action at the interfacing surfaces between annular rings 230 and 231.

Referring to FIG. 5, a combination of two novel seals may be utilized to join two tube-like portions V and W similar to the body Y depicted in FIG. 1. An annular member 329, includes two axial extending tubulations 354 and 454 which accomplish the analogous functions of two of the tubulations 54 of FIG. 1 back-to-back. Annular rings 330 and 430 are constructed similar to the ring 30 depicted in FIG. 1. Also, annular rings 331 and 431 are constructed similar to the ring 31 depicted in FIG. 1. Such a back-to-back construction of the novel seal, for example, could be utilized to mount an operative electrode, such as the microchannel plate 16 depicted in FIG. 1, without encountering the previously mentioned defficiencies of prior sealing methods.

By providing a method of resisting and yet relieving the compressive forces exerted at the compression sealing interface of rings 29 and 30, within the seal itself, the novel seal permits the utilization of far smaller thicknesses of materials (i.e., "thinwalled") in the envelope portions to be joined (e.g., the tube-like body Y) then permitted with prior compression seals. The novel seal permits the design of more compact and light weight devices. The novel seal provides a strong, inexpensive and reliable annular seal between two envelope portions. The seal has been used to assemble small light weight image intensifier tubes in vacuums in excess of $10^{-10}$ torr. A seal may be accomplished without the additional application of heat (a cold seal) at room temperatures without the creation of contaminents (e.g., gases) which could cause the destruction of certain closely mounted and delicate operative elements within the device (e.g., the photocathode 14). Also, the novel seal has maintained its integrity at bake out temperatures exceeding 400°C. without noticable defects. Lastly, the novel seal permits the assembly of devices having members with substantially dissimilar coefficients of expansion, thereby permitting the use of a greater variety of materials for the body of the assembled device.

For the purpose of simplicity, a vacuum tight seal or a seal condition has at times herein been referred to in the specification simply as "a seal" or "sealed". For convenience, two or more members are said to be "attached" whenever they are joined or sealed in a non-critical manner.

In the completed seal, the tubulations of respective portions or rings are considered in "telescoped" relation to each other, without regard to which of the tubulations extends within the other.

Materials, which are sealed together, are said to possess "compatible" coefficients of thermal expansion whenever the integrity of the interposed seal is maintained over the temperature range desired for the application.

What I claim is:

1. A vacuum tight envelope comprising:
   at least two envelope portions, a first portion including an axially extending first tubulation, and a second portion including an L-shaped annular ring attached to said second portion at a radial extending portion of said L-shaped annular ring, said L-shaped annular ring also including an axial extending second tubulation, said first tubulation having an inner diameter larger than the outer diameter of said second tubulation, said first and second tubulations being in telescoped aligned relation to each other, and
   an annular ring of high compressive strength interposed between and sealed in telescoped relation to said first and second tubulations, said first and second tubulations each including sealing surfaces thereon interfacing with corresponding sealing surfaces on said annular ring, said interfacing sealing surfaces between said first tubulation and said annular ring including a vacuum tight cold compression seal, said annular ring additionally including a radially extending lip portion which provides axial separation between interfacing surface portions of said L-shaped annular ring and said annular ring.

2. A vacuum tight envelope in accordance with claim 1, wherein a portion of said interfacing sealing surfaces of said annular ring and said second tubulation is sealed by brazing.

3. A vacuum tight envelope in accordance with claim 2, wherein an unsealed portion of interfacing axially extending surfaces between said annular ring and said second tubulation includes an annular gap of sufficient size for avoiding capillary action between said interfacing surfaces.

4. A vacuum tight envelope comprising at least two portions wherein a first portion is sealed to a second portion, said first portion having an axial extending tubulation with a cylindrical compression sealing surface thereon, said second portion including a hermetically sealed annular axial extending member attached thereto, said annular axial extending member telescoped partly within the tubulation of said first portion and including a compression sealing surface thereon, which interfaces with said cylindrical compression sealing surface on the tubulation of said first portion and which is sealed thereto by a cold compression seal, said annular axial extending member including:
   a. an L-shaped annular ring attached to said second portion at a radial extending portion of said L-shaped annular ring, said L-shaped annular ring including an axial extending tubulation; and
   b. an annular relieving ring of high compressive strength attached to a terminal portion of the axial extending tubulation of said L-shaped annular ring; said annular relieving ring including an annular portion in telescoping relation to said axial extending tubulation of said L-shaped annular ring; the telescoping annular portion of said annular relieving ring, and said L-shaped annular ring, each including a surface portion, which faces the surface portion of the other, and which is spaced apart from the surface portion of the other to resist and relieve compressive forces exerted in the formation of said cold compression seal between said tubulation of said first portion and said annular axial extending member, without transmitting said compressive forces to said second portion of said envelope.

5. A vacuum tight envelope comprising:
   at least two envelope portions, a first portion including an axially extending first tubulation, and a second portion including an L-shaped annular ring attached to said second portion at a radial extending portion of said L-shaped annular ring, said L-shaped annular ring also including an axial extending second tubulation, said first tubulation having an inner diameter larger than the outer diameter of said second tubulation, said first and second tubulation being in telescoped aligned relation to each other, and
   an annular ring of high compressive strength interposed between and sealed in telescoped relation to said first and second tubulations, said first and second tubulations each including sealing surfaces thereon interfacing with corresponding sealing surfaces on said annular ring, said interfacing sealing surfaces between said first tubulation and said annular ring including a vacuum tight cold compression seal, said L-shaped annular ring additionally including an unattached radial surface portion spaced apart from a facing surface portion of said annular ring, the spacing therebetween providing an annular thermal expansion gap for absorbing differences in thermal expansion between said annular ring and said L-shaped annular ring.

6. A vacuum tight envelope in accordance with claim 5, wherein a compressible filler material is provided within said thermal expansion gap.

* * * * *